April 24, 1962 F. R. WERNER ET AL 3,031,134
MULTIPLE TOTALIZERS AND SELECTING AND
FUNCTION CONTROL MEANS THEREFOR
Original Filed Feb. 25, 1954 4 Sheets-Sheet 2
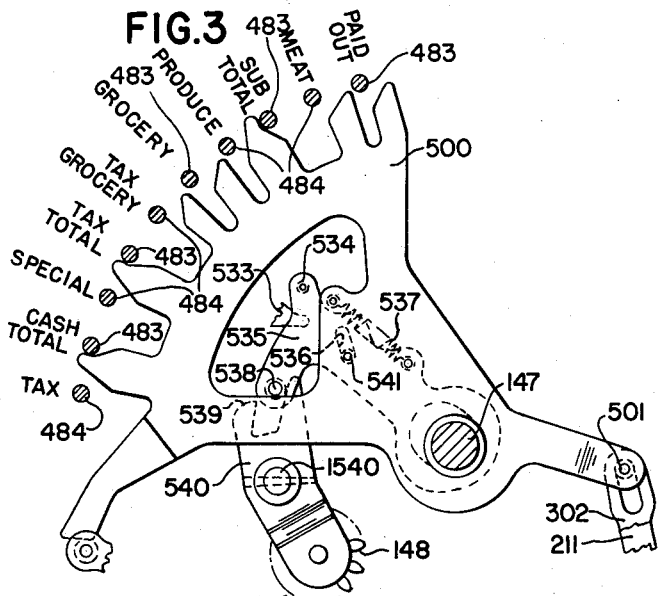
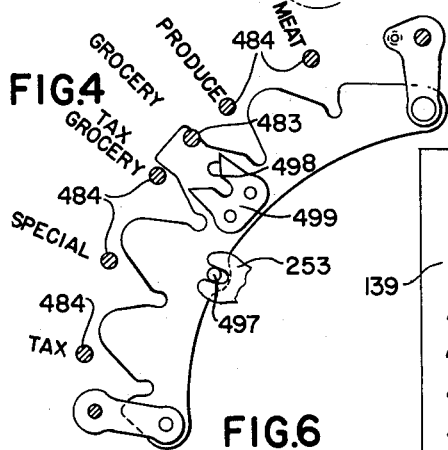
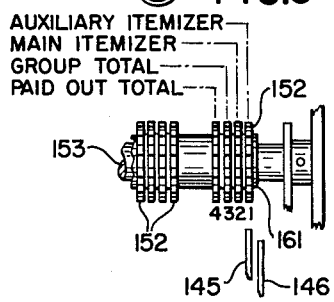
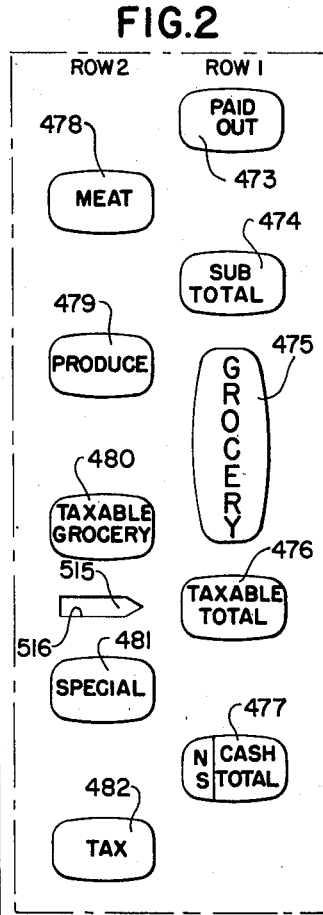
INVENTORS
FRANK R. WERNER
KENNETH C. FLINT
BY
THEIR ATTORNEYS

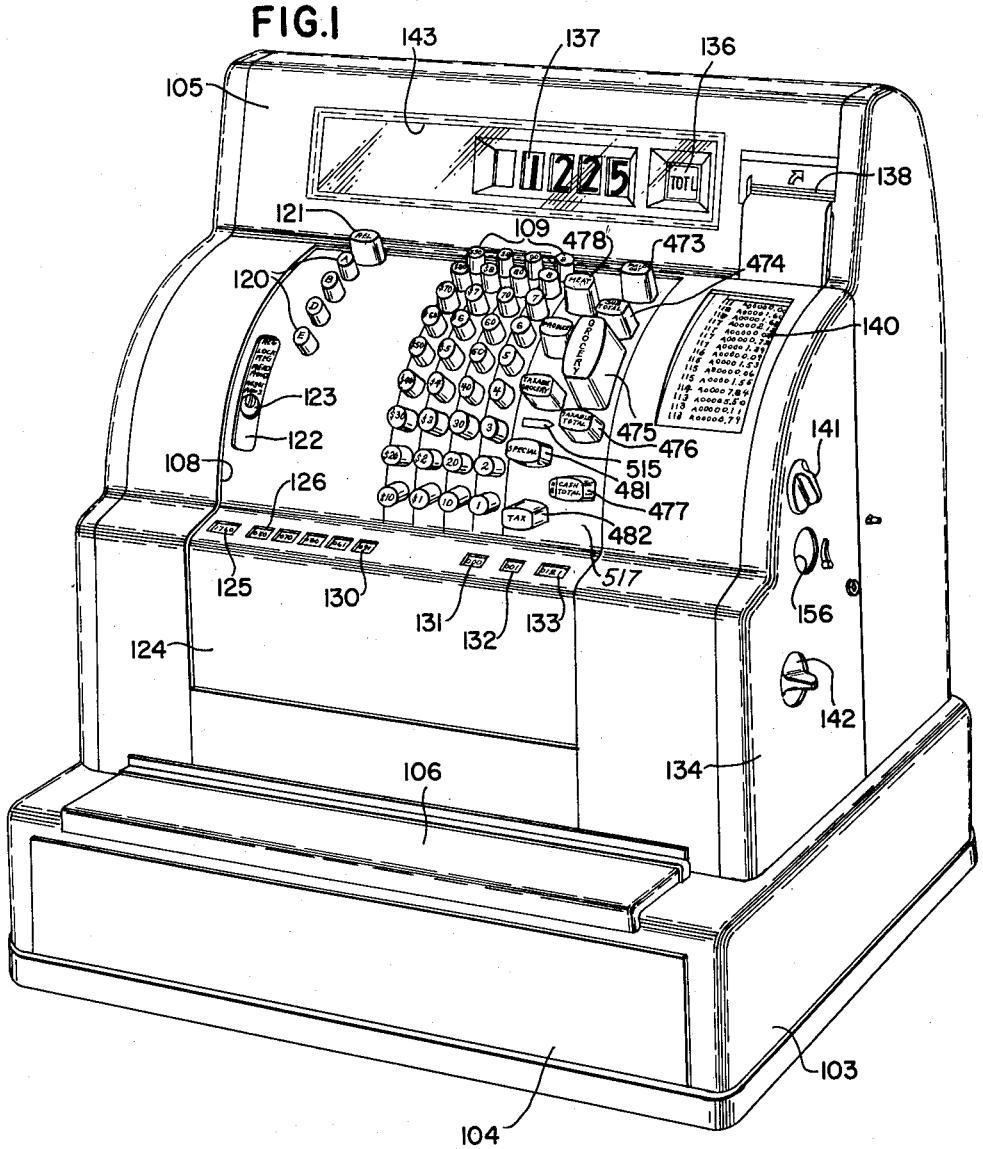

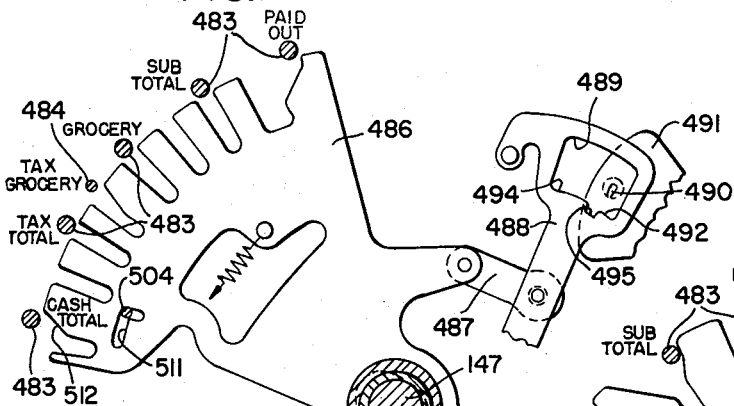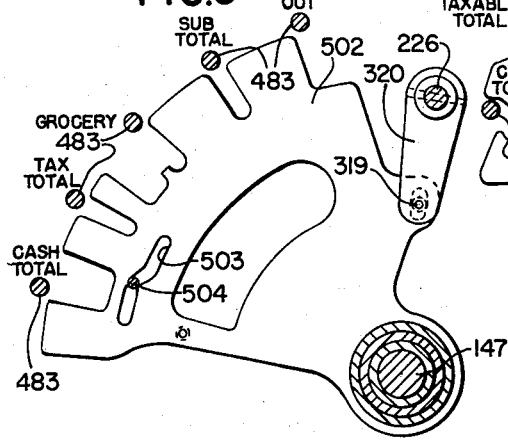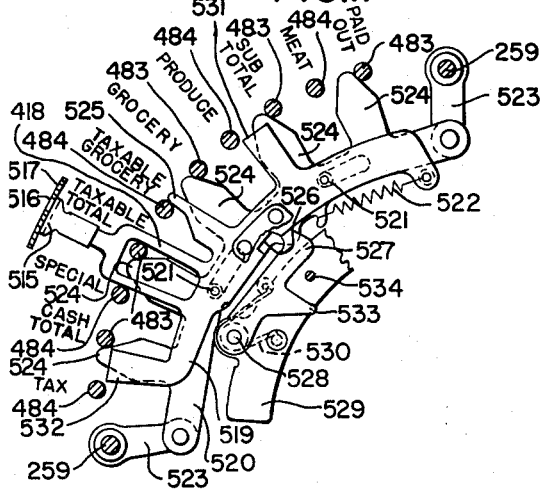

April 24, 1962 F. R. WERNER ET AL 3,031,134
MULTIPLE TOTALIZERS AND SELECTING AND
FUNCTION CONTROL MEANS THEREFOR
Original Filed Feb. 25, 1954 4 Sheets-Sheet 4

INVENTORS
FRANK R. WERNER
KENNETH C. FLINT

BY Louis A. Kline
Richard Van Busum
THEIR ATTORNEYS

United States Patent Office 3,031,134
Patented Apr. 24, 1962

3,031,134
MULTIPLE TOTALIZERS AND SELECTING AND FUNCTION CONTROL MEANS THEREFOR
Frank R. Werner, Dayton, and Kenneth C. Flint, West Carrollton, Ohio, assignors to The National Cash Register Company, Dayton, Ohio, a corporation of Maryland
Original application Feb. 25, 1954, Ser. No. 412,464, now Patent No. 2,962,209, dated Nov. 29, 1960. Divided and this application Mar. 25, 1959, Ser. No. 801,795
2 Claims. (Cl. 235—6)

This invention relates to cash registers and accounting machines, and is particularly directed to the totalizer-controlling mechanism of such machines.

This application is a division of the co-pending application for United States Letters Patent, Serial No. 412,464, filed February 25, 1954, now Pat. No. 2,962,209, by Frank R. Werner and Kenneth C. Flint, inventors.

It is a general object of this invention to provide a compact and efficient cash register of economical construction, having many of the appointments and features of larger and more costly machines.

Another object is the provision of a machine of economical and efficient structure having tow totalizer lines, each of which supports a plurality of sets of selectable totalizers.

Still another object is to provide improved means for selecting and conditioning the various totalizers for co-action with the amount differential mechanism.

Another object of this invention is to provide means for separately listing different classes of items, without the necessity of pre-sorting said items into their separate classes.

Another object is the provision of a dual listing mechanism for use in connection with cash registers and accounting machines.

A further object is to provide a machine of the character described, with two item totalizers for the indiscriminate listing of two different classes of items.

Another object is to provide a machine having two item totalizers, with means to visibly indicate the condition of one of said item totalizers.

A further object is to provide a machine having two item totalizers, with means for enforcing the clearing or zeroizing of a certain one of said totalizers before the other of said totalizers may be cleared.

Still another object is to provide a machine having two item totalizers, with means rendered effective by the entering of an amount in one of said totalizers to enforce a total-taking operation in said totalizer before a total-taking operation may be performed in the other totalizer.

A further object is to provide a machine having two item totalizers with means rendered effective by a first control element for totalizing one of the item totalizers and for transferring the amount therein to the other item totalizer.

With these and incidental objects in view, the invention includes certain novel features of construction and combinations of parts, a preferred form or embodiment of which is hereinafter described with reference to the drawings which accompany and form a part of this specification.

In the drawings:

FIG. 1 is a perspective view of the machine embodying the various features of the present invention.

FIG. 2 is a diagrammatic view showing the #1 and #2 rows of transaction keys for the machine of this invention.

FIG. 3 is a detail view of the control segment for controlling the engaging and disengaging movement of the totalizer lines under control of the keys shown in FIG. 2.

FIG. 4 is a detail view of the control plate for selecting the totalizers on the #2 totalizer line.

FIG. 5 is a facsimile of a multiple-item receipt issued by the machine.

FIG. 6 is a fragmentary detail view, showing two denominational orders of the #1 totalizer line.

FIG. 7 is a right side elevation of a portion of the selecting mechanism for the totalizers on the #1 totalizer line.

FIG. 8 is a detail view of the segment which operates in conjunction with the segment shown in FIG. 7, for controlling the selection of the totalizers on the #1 line.

FIG. 9 is a detail view of the locking plate controlled by the total control lever for locking the control keys under certain conditions.

FIG. 10 is a detail view of the mechanism for locking the segments, shown in FIGS. 7 and 8, together for unitary movement under control of the locking plate shown in FIG. 9.

FIG. 11 is a detail view of the indicating mechanism for indicating when the amount of a taxable item has been entered in the auxiliary itemizer.

Figure 12:
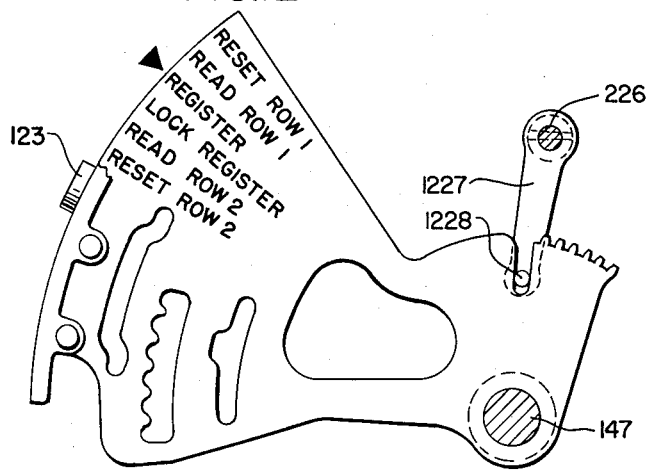
FIG. 12 is a side elevation of the total control lever.

The machine chosen to illustrate the present invention has many basic principles and features which are similar in many respects to those of a well-known type of cash register, which is fully disclosed in the following United States Patents: No. 1,816,263, issued July 28, 1931; No. 1,929,652, issued October 10, 1933; No. 2,048,200, issued July 21, 1936; and No. 2,056,485, issued October 6, 1936, all to William H. Robertson.

Reference may be had to the above-listed patents for a history of the development of the pioneer machines of this type and for a complete disclosure of mechanism used in the present machine, which is similar to the corresponding mechanism of the pioneer or basic machines, and which for that reason will be described only in general terms in the present application.

Likewise, the machine embodying the present invention is identical in its appearance and in many of its structural details to the machine disclosed in co-pending application for Letters Patent of the United States, Serial No. 341,633, filed March 11, 1953, now Pat. No. 2,880,930 by Frank R. Werner et al., inventors, to which reference may be had for a full disclosure of similar mechanism illustrated in the present application, and which will be described only in general terms, unless it is pertinent to the present invention.

MACHINE IN GENERAL AND ITS SUPPORTING FRAMEWORK

The mechanism of the machine is supported by right and left side frames, not shown, and by corresponding auxiliary frames, not shown, secured to the upper ends of said right and left frames, which latter are in turn secured at their lower ends to a machine base plate, not shown. The base plate rests in and is secured to a shallow pan, not shown, in turn secured to the top surface of a drawer cabinet 103 (FIG. 1), which has mounted therein a cash drawer 104, which opens automatically at the end of certain machine operations, and which may be opened manually by authorized persons, having a key to the right-hand closure of a machine case or cabinet 105 (FIG. 1). The cabinet 105 encloses the mechanism of the machine and is constructed of suitable material, such as sheet metal, and is secured to the machine base plate near its perimeter by suitable screws, which engage threaded holes in said machine base plate. The side frames are maintained in proper side-spaced relationship to each other by the base plate, by a back plate, not shown, secured between said side frames, and by various cross bars, plates, rods, and shafts.

The cabinet 105 (FIG. 1) has a large opening 108 in its front, to provide proper clearance for the keyboard.

The keyboard of the present machine comprises four rows or denominational orders of amount keys 109, a first row of selecting or control keys 473 to 477 inclusive, a second row of selecting or control keys 478 to 482 inclusive, four Clerks' keys 120, and a Release key 121, for releasing any depressed key prior to operation of the machine. The keyboard of the machine also includes a total control lever 122, often referred to as a "Unit Lock Lever," which is movable to various positions to control the various functions of the machine, said positions including Adding or Register position, Lock-Register position, and #1 and #2 Reading and Resetting positions. The total control lever 122 (FIGS. 1 and 12) has incorporated therein a lock 123, which is provided with two keys, one of which permits said lever to be locked in either Register or Lock-Register position, so that said lever may not be moved out of these positions by unauthorized persons not in possession of said key. The total control lever 122 is normally locked against movement into either #1 or #2 Reset position, and a special reset key is provided for the lock 123, for unlocking the lever, so that it may be moved to either of these reset positions. It is, therefore, impossible for persons not in possession of a reset key to move the total control lever to either of its reset positions to clear the amount from any of the totalizers which are controlled by said lever 122.

The keyboard of the machine likewise includes a plurality of special counters 125 to 133 inclusive (FIG. 1), the wheels of which are visible through corresponding openings in a special counter cover plate 124, which is secured to the machine framework and is readily removable, when the machine cabinet 105 is removed, to provide access to the special counter mechanism.

The special counters include a Reset counter 125, which counts "1" each time the total control lever 122 is moved to either #1 or #2 Reset position, and five #2 transaction counters 126 to 130 inclusive, which correspond to the transaction control keys 478 to 482 and are selected for actuation by said control keys through their differential mechanism. Use of one of the control keys 478 to 482 to select the corresponding totalizer on the #2 line for actuation in either adding, reading, or resetting operations causes the corresponding special counter 126 to 130 to be selected for actuation, and during machine operation "1" is added in said corresponding counter.

There are three special counters, 131, 132, and 133, for the first row of transaction keys. Like the #2 transaction keys, use of one of the #1 transaction or control keys 473 to 477 controls the selection of the corresponding special counter 131, 132, or 133, to keep an accurate count of the number of times these keys are used in certain transactions.

The #1 control key 477 has two functions, Cash Total and No-Sale, and, when said control key is used in a No-Sale transaction, it causes "1" to be entered in the No-Sale special counter 131 to keep an accurate count of the number of No-Sale transactions. All of the special counters 126 to 133, inclusive, may be reset to zero at the same time by a knob, not shown, which is accessible through a closure 134 on the right-hand side of the cabinet 105. The closure 134 is provided with a lock, so that only authorized persons in possession of the key to said lock may have access to the reset knob for resetting the special counters.

Each row of control keys is provided with the usual differential mechanisms for controlling the positioning of corresponding front and back indicators 136 (FIG. 1), only the front indicators being shown herein, for indicating the type of operation being performed. Likewise, the control differential mechanisms are connected to and position corresponding type wheels for printing data corresponding thereto upon issuing receipts (FIG. 5), which are fed out an opening 138 provided therefor near the upper right-hand portion of the cabinet 105, and for printing similar information upon a detail strip 140 (FIG. 1), a portion of which is visible through an opening in the right-hand side of the cabinet adjacent the control keys. The front indicators 136 are visible through an opening 143 in the front of the cabinet 105, and the rear indicators are visible through a similar opening in the back of the cabinet.

Like the control keys, each row of amount keys 109 (FIG. 1) is provided with the usual differential mechanism for positioning corresponding amount type wheels for printing amounts on the receipts (FIG. 5) and on the detail strip 140, and for positioning corresponding front and back indicators 137, only the front indicators shown here, said front indicators being visible through the opening 143. The Clerks' keys 120 are also provided with a differential mechanism for positioning corresponding type wheels for printing identifying letters on the receipts and on the detail strip.

Inasmuch as the last several items printed on the detail strip 140 are not visible through the opening in the cabinet 105, mechanism is provided for temporarily advancing the detail strip 140 so that said last few items will be visible. The mechanism for advancing the detail strip is operated by a knob 141, mounted on the closure 134 and engageable with the advancing mechanism when said closure is in closed position, as shown in FIG. 1. Operation of the knob 141 in one direction advances the detail strip 140 against spring tension, so that the last few entries thereon are visible through the opening in the cabinet. Releasing the knob 141 permits the detail strip 140 to be spring-returned to its original printing position. Means is also provided for manually advancing the web of the detail strip 140 when necessary or desirable, and this mechanism is operated by a knob 142, which extends through an opening in the closure 134.

The machine is normally operated by the usual type of electric motor, not shown, but fully disclosed in the application, Serial No. 341,633, referred to before. However, in emergencies, the machine may be operated manually by means of a hand crank, not shown, which is inserted through an opening 156 provided therefor in the closure 134 (FIG. 1). A rockable shutter normally closes the opening 156.

The present machine is provided with two lines of interspersed totalizers, and in the present adaption the #1 or lower totalizer line, which is controlled by the keys 473 to 477 inclusive (FIGS. 1 and 2), has four sets of interspersed totalizers thereon, and the #2 or upper totalizer line, which is controlled by the keys 478 to 482 inclusive, has five sets of interspersed totalizers thereon, said totalizer lines being shiftable laterally under control of their corresponding control keys to aline the selected totalizer thereon with the amount differential mechanism for actuation thereby. Likewise, the control keys, in conjunction with the total control lever 122, control the engaging and disengaging movement of the selected totalizer and the amount differential mechanism for entering amounts in said selected totalizers and for the taking of totals therefrom. Each totalizer line is provided with a tens transfer mechanism for transferring tens digits from lower to higher denominations.

In addition to their other functions, the #1 control keys 473 to 477 are what are termed in this art as "motorized keys," in that any one of these keys, when depressed, initiates operation of the machine. Likewise, the #2 control keys 478 to 482, inclusive, may also be motorized keys, if desired, depending upon the requirements of the business system to which the machine is being applied.

In the ensuing pages, mechanism pertinent to the present invention will be described in detail. For a full disclosure of other mechanism of the machine, reference may be had to the patents and to the applications listed near the beginning of this specification.

DETAILED DESCRIPTION

Amount Keys and Differential Mechanisms Therefor

As explained previously in connection with FIGS. 1 and 2, the present machine is provided with four rows of amount keys 109, and each row of amount keys is provided with a corresponding differential mechanism comprising primary and secondary differential members for transmitting the value of the depressed key to the indicating and printing mechanisms and for setting the wheels of the selected totalizer according to the value of said depressed amount key.

Inasmuch as the several amount banks are similar in construction and are fully disclosed in the application Serial No. 341,633, it is believed that a general description of one of the amount banks will adequately serve the present purpose.

The amount keys 109, for each denominational row on order, are slidably mounted in a key frame, not shown, in turn supported by rods (not shown) extending between the main frames. Depression of an amount key 109 in one denominational order moves the lower end of its stem into the path of a projection on a corresponding primary differential member 145 (FIG. 6), which, together with a companion secondary differential member 146, is freely supported on a shaft 147 (FIG. 3) journaled in the main frames of the machine. The primary and secondary differential members 145 and 146 are coupled together for concert movement, at proper times, by a corresponding coupling pinion 148 (FIG. 3).

The primary and secondary differential members 145 and 146 are actuated by means of the usual universal rod, not shown, which extends through openings in said differential members and which oscillates back and forth to actuate the differential mechanism. The secondary differential member 146, through the usual train of gearing, transmits its positioning to the corresponding type wheels and indicators, in the usual and well-known manner, as fully disclosed in the application Serial No. 341,633.

Initial movement of the universal rod permits the primary member 145, under spring tension, to follow in unison therewith until the projection thereon strikes the lower end of the stem of the depressed amount key 109 to position said primary differential member 145 according to the value of said depressed amount key. After the primary differential member 145 has been positioned, the universal rod continues its initial movement to restore the secondary differential member 146 and the mechanism connected thereto, including the corresponding type wheels and indicators, to zero position.

Prior to initial movement of the primary and secondary differential members 145 and 146, the coupling pinion 148 is disengaged therefrom, so that said members are free to move independently of each other to be positioned and restored, as explained above.

After the primary differential member 145 has been positioned according to the depressed amount key 109 and the secondary differential member 146 has been restored to zero, the coupling pinion 148 is reengaged with said members to couple them together, whereupon return movement of the universal rod carries the primary differential member 145 from its set position to zero or home position and positions the secondary member 146 in accordance therewith. The secondary differential member 146 in turn positions the corresponding type wheels and indicators in accordance with the value of the depressed amount key 109.

Teeth in the periphery of the primary differential member 145 cooperate with similar teeth in the corresponding ones of four sets of totalizer wheels 152, mounted on a sleeve 161 slidable on a #1 totalizer shaft 153, and with teeth in the corresponding ones of five sets of totalizer wheels, not shown, mounted on a #2 totalizer line.

In adding operations, after the primary differential member 145 has been positioned, under influence of the depressed amount key 109, as explained above, the corresponding wheels of the selected totalizers on the No. 1 and No. 2 totalizer lines are engaged with said primary differential member 145, and return movement thereof rotates said selected wheels a distance in an additive direction corresponding to the value of the depressed amount key, to enter said value in said wheels. After the primary differential member 145 has arrived in home or zero position, the selected totalizer wheels are disengaged therefrom.

When no amount key 109 is depressed in the denominational order being described herein as representative of all the amount banks, a zero stop bar, not shown, is moved inwardly from normal ineffective position into the path of the projection on the primary differential member 145 to obstruct movement of said primary differential member away from home or zero position, said primary differential member, in turn, causing the corresponding secondary differential member 146 and connected type wheels and indicators to be positioned accordingly.

In sub-total and total-taking operations, often referred to as read and reset operations, the wheel 152 (FIG. 6) of the selected totalizer on the No. 1 is engaged with the primary differential member 145 prior to its initial movement, which movement reversely rotates said wheel to zero to position said primary differential member according to the value on said wheel. Prior to positioning of the primary differential member 145 by the selected totalizer wheel, the coupling pinion 148 is disengaged, as explained above, to permit independent movement of said primary differential member 145 and its secondary differential member 146, said latter member being restored to zero position, as explained in connection with adding operations.

After the primary differential member 145 has been positioned by the selected totalizer wheel and the secondary differential member 146 has been restored to zero position, the coupling pinion 148 is engaged to couple said differential members for concert movement, whereupon counter-clockwise return movement of the universal rod returns the primary differential member 145 from set position to zero position and carries the secondary differential member 146 in unison therewith a like extent, to position the corresponding type wheels and indicators in accordance with the amount standing on the zeroized totalizer wheel. In reset operations, the wheel of the selected totalizer is disengaged from the primary differential member 145 prior to its counter-clockwise return movement, and consequently said wheel remains in zeroized condition. In reading operations, the wheel of the selected totalizer is reengaged with the primary differential member 145 prior to its return movement and is restored thereby to its original position to preserve the total for further computations.

The depressed amount key 109 (FIGS. 1 and 2) is automatically released near the end of adding operations and may be manually released by depression of the release key 121, in case it is desirable or necessary. The amount keys 109 are of flexible construction, in that depression of one amount key releases a previously-depressed amount key in the same row and the latter depressed key is retained depressed.

PLURAL ITEM TOTALIZERS

For Different Classes of Items

Many customers of large grocery chain stores or super markets do their basic shopping weekly, and generally this shopping involves the purchase of many and varied items, some of which are taxable and some of which are not taxable. The taxable items and the non-taxable items are mixed indiscriminately during shopping, and the computation of the tax on the taxable items presents quite a problem for the cashier when the purchases are checked out, as most of these stores are self-serve stores and utilize what is known as the "check-out system" for determining the value of the purchased items.

Generally, the machine used in connection with most of the check-out systems has only one itemizer or item totalizer for listing the purchased items as they are checked out, and to properly handle taxable items with such a system requires that such items be separated or pre-sorted from the non-taxable items and listed first. After all taxable items have been listed, a sub-total or reading operation is performed to obtain the total amount of said items and the recording or indication of this sub-total is used for computing the tax, which may be done mentally or by use of a chart, and afterward the amount of the tax is entered in the machine. The presorting of taxable items requires considerable time and slows up the movement of customers through the checkout line, and presents quite a serious problem during rush periods.

This application discloses a dual-listing or selective item mechanism which remedies the above undesirable condition, and this mechanism comprises two item totalizers on the No. 1 line, one for the entering of taxable items and one for the entering of non-taxable items. This permits the use of a check-out system in which the taxable items and the non-taxable items may be listed indiscriminately, and thus eliminates the preliminary sorting of taxable items prior to the listing operation. In this simplified and efficient dual-listing system, it is required only that taxable items be entered in the tax or auxiliary item totalizer and that non-taxable items be entered in the non-tax or main item totalizer, in the order in which these items are encountered during the check-out process. After all of the various items have been listed, an enforced Tax Total operation is performed to clear the auxiliary item totalizer and add the amount of the taxable items therein in the main item totalizer. During the clearing of the auxiliary item totalizer, the amount therein is displayed on the amount indicators 137 (FIG. 1) and is used by the operator for computing the tax on said items, which tax is then set up on the amount keys and, in a tax operation, is entered in the main item totalizer and in the tax totalizer on the #2 totalizer line. Finally, a cash total operation is performed to clear the total amount from the main item totalizer and to simultaneously add said total amount in the group totalizer on the #1 line and indicate and record said total amount.

In the present embodiment, the #1 totalizer line is provided with four sets of totalizer wheels, two sets of which are the auxiliary and main item totalizers referred to above, the third set being the group totalizer referred to above, which accumulates a total of the amounts cleared from the main item totalizer, and the fourth set being a paid-out totalizer for accumulating totals of paid-out items. The main item totalizer is used exactly like the item totalizer disclosed in the parent application for temporarily accumulating totals of non-taxable items in multiple-item transactions, and in the present adaptation the auxiliary item totalizer is used, as explained above, for temporarily accumulating totals of taxable items in multiple-item transactions.

Obviously, the use of the auxiliary item totalizer for the accumulation of taxable items is only one use for such a totalizer and is presented here merely as an example and is not to be implied as a limitation, as there are many other ways in which two item totalizers may be used to advantage in the keeping of separate totals of any desired items.

As explained above, with the exception of the two item totalizers on the line #1, the present machine is similar in every respect to that of the parent application. However, the controlling mechanism for the two item totalizers comprises many unusual features which are restricted, more or less, to the machine of this application and will be described in detail hereinafter.

*Differential Mechanism for Control Banks*

Each of the first and second transaction or control banks (FIGS. 1 and 2) has a differential mechanism, similar in many respects to the amount differential mechanism, explained above, said differential mechanisms comprising primary differential members (not shown) and corresponding secondary differential members (not shown) free on the shaft 147 (FIG. 3) and positioned in exactly the same manner as explained for the amount differentials under influence of their corresponding #1 transaction keys 473 to 477 inclusive, and #2 transaction keys 478 to 482 inclusive. The secondary differential members for the transaction banks control corresponding type wheels for printing identifying data on the detail strip 140 and on the issuing receipts 139 (FIGS. 1 and 5) and also control the positioning of the indicator 136 (FIG. 1), to visually indicate the data represented thereby.

As previously explained, the totalizer wheels 152 (FIGS. 6 and 13) of the #1 totalizer line are rotatably supported on a sleeve 161, in turn shiftably mounted on a shaft 153, supported in a framework, not shown, which is shiftably mounted between totalizer end plates, not shown, which are in turn secured to the corresponding main frames.

Each of the row #1 transaction or control keys 473 to 477 inclusive carries a stud 483 (FIG. 8), which cooperates with corresponding camming surfaces formed in corresponding indentations or notches in the periphery of a shifting segment 485 free on the shaft 147. A rearward extension of the segment 485 has a notch which engages a stud 165 (FIG. 13) in an upward extension of an arm 166 free on a stationary stud 167. The arm 166 is flexibly connected to a companion gear sector 168 by a spring 174 tensioned between said arm and said sector, which spring normally maintains a shoulder on said arm in yielding contact with a stud 169 carried by said gear sector 168. The teeth of the sector 168 mesh with a gear 170 free on a stationary stud 175 and integral with a drum cam 1176 having a spiral groove engaged by a roller 1177 carried by a block 1178 fast on a shifting rod 1179 supported in the machine framework. Also fast on the rod 1179 is a shifting fork 1180, which engages an annular groove in a collar 1181 mounted on the sleeve 161 to shift as a unit therewith on the shaft 153 (FIG. 6).

Depressing one of the keys 473—477 (FIGS. 2, 8, and 13) rocks the segment 485, the arm 166, the sector 168, the gear 170, and the cam 1176 the proper extent to position said parts in accordance with the depressed key. The spiral groove in the cam 1176, coacting with the roller 1177, in turn imparts proper horizontal shifting movement to the block 1178, the rod 1179, the fork 1180, and the sleeve 161 to position said parts accordingly and thus to aline the set of wheels 152 (FIG. 6) corresponding to the depressed key 473—477 with the primary differential members 145. A slot in the block 1178 (FIG. 13) freely engages the reduced end of a stationary stud 1182 to prevent rotation of said block and the roller 1177 during their horizontal shifting movement. Normally, the wheels of the auxiliary item totalizer are in alinement with the primary differential members, as shown in FIG. 6.

Depressing the Paid-Out key 473 (FIG. 8) causes the stud 483, in cooperation with the corresponding camming surface on the segment 485, to shift the #1 totalizer line three steps to aline the fourth set of wheels (FIG. 6), constituting the Paid-Out totalizer, with the primary differential members for actuation thereby. Depressing the Grocery key 475 rocks the segment 485 clockwise to aline the second set of wheels on the #1 totalizer line with the primary differential members for actuation thereby. The second set of wheels on the #1 totalizer line constitute the main item totalizer, in which a total of all items is temporarily accumulated. The Sub-Total key 474 and the Cash Total key 477 also rock the segment 485 a proper extent clockwise to aline the wheels of the main item totalizer with the primary differential members for actuation thereby, in reading and resetting time, respectively. The stud 483 in the stem of the Taxable Total key 476 (FIG. 8) imparts no shifting movement to the segment 485, and consequently the wheels of the No. 1 or auxiliary item totalizer remain in alinement with the primary differential members for actuation thereby.

It should, therefore, be evident from the foregoing description that depressing any one of the #1 control keys 473 to 477, through the segment 485, shifts the corresponding set of totalizer wheels on the #1 line into alinement with the primary differential members for actuation thereby.

In addition to the manual shifting of the #1 totalizer line, automatic means is provided for shifting said line to transfer totals from the auxiliary item totalizer to the main item totalizer and from the main item totalizer to the group totalizer, in taxable total and cash total operations, respectively.

It will be noted that the slot in the segment 485 (FIG. 8) for the stud 483 for the Taxable Total key 476 is enlarged at the bottom to permit the shifting of said segment 485 under influence of the mechanism shown in FIG. 7.

Figure 13:
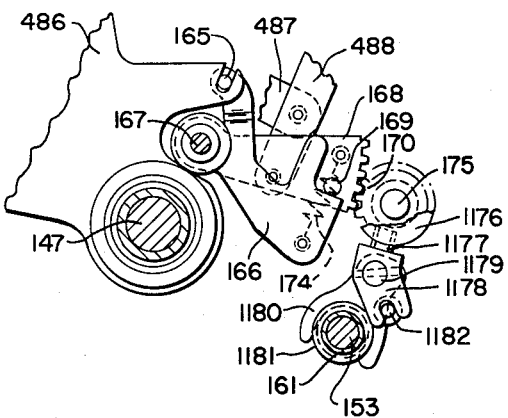
FIG. 13 is a side elevation of a portion of the selecting mechanism for the totalizers on the No. 1 totalizer line.

The studs 483 in the stems of the keys 473 to 477 also coact with corresponding slots in the mutilated periphery of a segment 486 (FIG. 7) free on the shaft 147 and connected by a link 487 to a shifting arm 488 pivotally connected at its lower end to the sector 168 (FIG. 13). The upper end of the arm 488 has an opening 489 with control surfaces, which cooperate with a stud 490 in a shifting segment 491, which receives movement from normal position, as shown here, first downwardly, then upwardly beyond normal position, and then back to normal position, for imparting automatic shifting movement to the #1 totalizer line in transfer-total operations.

The stud 483 in the Taxable Total key 476 coacts with a slot in the segment 486, which imparts no movement to said segment, and consequently it and the arm 488 remain in the position here shown, in which the operating stud 490 is opposite and coacts with a control surface 492 in the opening 489. As previously explained, depression of the Taxable Total key 476, through the segment 485 (FIG. 8) alines the wheels 152 of the auxiliary item totalizer with the primary differential members 145. In the beginning of a Taxable Total operation, the auxiliary totalizer wheels 152 are engaged with the primary differential members 145, which then receive initial movement and reversely rotate said wheels to zero, thus to position said differential members accordingly. After being reset, the auxiliary item totalizer wheels are disengaged from the primary differential members, and downward operation of the shifting segment 491 (FIG. 7) follows immediately to cause the stud 490 to engage the surface 492 and shift the arm 488 downwardly. This, through the mechanism shown in FIG. 13 and explained earlier herein, imparts one step of shifting movement to the #1 totalizer line to aline the wheels 152 (FIG. 6) of the main item totalizer with the primary differential members 145, prior to their return movement. The wheels of the main item totalizer are then engaged with the primary differential members prior to their return movement, which movement rotates said wheels additively in accordance with the amount cleared from the auxiliary item totalizer to enter said amount therein. Return movement upwardly of the segment 491, near the end of machine operation, causes the stud 490 to engage the upper surface of the opening 489 to shift the arm 488 upwardly to its normal position, as shown in FIG. 7, in which position the wheels of the auxiliary item totalizer are again in alinement with the primary differential members.

The stud 483 (FIGS. 2 and 8) of the Cash Total key 477, cooperating with the corresponding slot in the segment 485, shifts said segment one step clockwise to aline the wheels of the main item totalizer with the primary differential members. It will be noted that the slot in the segment 485 for the key 477 has sufficient clearance in its bottom portion for the stud 483, to permit shifting said segment one additional step in a clockwise direction. The stud 483 (FIG. 7) for the Cash Total key 477, coacting with the corresponding slot in the segment 486, shifts said segment and the arm 488 clockwise to move a control surface 494 in the opening 489 in the path of the stud 490.

In the beginning of Cash Total operations, the wheels of the main item totalizer are engaged with the primary differential members prior to their initial movement, which movement rotates said wheels in a reverse direction to zero, to position said primary differential members accordingly. After the wheels of the main item totalizer have been zeroized, they are disengaged from the primary differential members, and, immediately thereafter, initial movement downwardly of the segment 491 (FIGS. 7 and 13) causes the stud 490 to engage the surface 494 and shift the arm 488 downwardly to aline the wheels of the #3 or group totalizer (FIG. 6) with the primary differential members prior to their return movement. The wheels of the group totalizer are engaged with the primary differential members prior to their return movement, which movement rotates said wheels in an additive direction to enter therein the amount cleared from the main item totalizer.

The stud 484 in the Taxable Grocery key 480 (FIG. 7), upon depression of said key, coacts with a corresponding camming slot in the segment 486 to shift said segment and the arm 488 clockwise to aline a low control surface 495 in the opening 489 with the stud 490. Subsequent operation of the segment 491 and of the stud 490 imparts no downward shifting movement to the arm 488, and consequently the wheels of the auxiliary item totalizer remain in alinement with the primary differential members.

The stud 483 in the Paid-Out key 473, coacting with the corresponding camming slot, shifts the segment 486 (FIG. 7) and the arm 488 clockwise to move the control surface 494 beneath the stud 490. However, this is of no importance in this case, as there is no transferring of totals in Paid-Out operations, and the stud 483 in the Paid-Out key (FIG. 8), coacting with the segment 485, controls the shifting of the #1 totalizer line to aline the #4 or Paid-Out totalizer wheels (FIG. 6) with the primary differential members, in the manner explained before.

The stud 484 in the stem of the Taxable Grocery key 480 (FIGS. 2 and 7) shifts the segment 486 and the arm 488 clockwise to aline the surface 495 with the stud 490, so that operation of said stud will impart no movement to the arm 488, and consequently the wheels of the #1 or auxiliary item totalizer will remain in alinement with the primary differential members throughout machine operation to accumulate a temporary total of taxable items.

It will be recalled that the Sub-Total key 474 and the Grocery key 475 (FIG. 2) both impart a similar extent of movement to the segment 485 (FIG. 8) to aline the wheels of the #2 or main item totalizer with the primary differential members, and it will be realized by referring to FIG. 7 that these keys impart no movement to the segment 486 and the arm 488, and, consequently, the surface 492 remains in the path of the stud 490 to insure that the wheels of the main item totalizer remain in alinement with the primary differential members.

It will be noted by referring to FIG. 4 that each of the #2 control keys 478 to 482 inclusive has in its stem one of the studs 484, which coacts with corresponding camming slots or notches in a #2 selecting plate 496 rockably supported by parallel arms in turn pivoted on studs secured in the #2 key frame. The plate 496 carries a stud 497, which engages a slot in the outer end of a lever 253, which, through the mechanism shown in FIGS. 4 and 11 of the parent application, Serial No. 412,464, controls the shifting of the #2 totalizer line to selectively aline the five sets of totalizer wheels thereon, corresponding to the #2 control keys, with the primary differential members.

Beginning with the lowermost #2 control key 482 (FIGS. 1 and 2) and continuing upward, these keys select, respectively, the number one to five sets of totalizer wheels on the #2 line. From this it is evident that the Taxable Grocery key 480 selects the #3 totalizer on the #2 line, as also does the Grocery key 475 in the first row, which, by means of the stud 483 (FIG. 4) therein, in cooperation with a cam slot 498 in a plate 499 secured to the selecting plate 496, positions said plate exactly the same as the stud 484 in the Taxable Grocery key 480, to select the #3 totalizer on the #2 line for actuation. It should, therefore, be realized that the amounts of both taxable and non-taxable groceries are entered in the #3 totalizer on the #2 line, while they are being entered in their respective item totalizers on the #1 line.

The studs 483 and 484 in the #1 and #2 control keys (FIGS. 2 and 3) cooperate, respectively, with corresponding camming slots in the mutilated periphery of a totalizer-engaging control segment 500 free on the shaft 147, said segment 500 being similar to and functioning exactly like the corresponding segment 213, shown in FIGS. 7 and 9 of the parent application, Serial No. 412,464, for controlling the engaging and disengaging movement of the selected totalizers on the #1 and #2 lines with and from the primary differential members. A rearward extension of the segment 500 carries a stud 501, which engages the slots in the upper ends of the engaging links 211 and 302 for controlling the positioning of the corresponding engaging pitmans in relation to their respective operating studs, in the manner explained in the parent application.

Depressing the Sub-Total key 474 (FIGS. 2 and 3) causes the stud 483 therein, in cooperation with the camming slot in the segment 500, to shift said segment one step counter-clockwise, which, through the link 211, lifts the engaging pitmans for the #1 totalizer line one step from register position to read position, in exactly the same manner as explained in the parent application. Inasmuch as the Sub-Total key, through the mechanism shown in FIG. 8 and explained before, selects the main item totalizer on the #1 totalizer line for a reading operation, the engaging mechanism, under control of the segment 500, causes said totalizer to be engaged and disengaged with and from the primary differential members in read timing.

The Taxable Total key 476 and the Cash Total key 477 each initiates a transfer total operation, and in this case the segment 500 (FIG. 3) is shifted one step counter-clockwise, exactly the same as in sub-total operations, which is necessary for the proper engagement and disengagement of the selected totalizers in transfer total operations. The Taxable Total key 476, it will be recalled, through the mechanism shown in FIGS. 8 and 15, first selects the auxiliary item totalizer for clearing during the first part of the taxable total operation, and, during the latter part of said taxable total operation, the main item totalizer will be automatically selected for addition, by the mechanism shown in FIGS. 7 and 13, to cause the taxable total to be transferred from the auxiliary item totalizer to the main totalizer, at the same time it is being indicated and recorded. In a like manner, the Cash Total key 477 causes the main item totalizer to be selected for a clearing operation in the first part of the cash total operation, and then causes the #3 or group totalizer on the #1 line to be automatically selected for addition during the latter part of said operation to transfer the total of the multiple-item transaction from the main item totalizer to the group totalizer, and to simultaneously indicate and record the result of this transaction.

From the foregoing explanation it should be clear that in transfer-total operations the engaging mechanism functions in sub-total timing, and during the first part of said operation a first selected set of totalizer wheels is zeroized to position the primary differential members accordingly, after which said set of totalizer wheels is disengaged from the primary differential members, and the mechanism shown in FIGS. 7 and 13 imparts shifting movement to the #1 totalizer line to aline a second selected set of totalizer wheels with the primary differential members. Immediately thereafter, the second set of wheels are engaged with the primary differential members prior to their return movement, which under ordinary circumstances would reenter the amount temporarily cleared from the first totalizer back in said first totalizer, but in this case the amount is entered in the second totalizer, so as to effect a transfer total operation in a single cycle of machine operation.

Counter-clockwise movement of the segment 500 (FIG. 3), upon depression of any one of the #1 control keys 474, 476, or 477, moves obstructing surfaces on the periphery of said segment into the path of the studs 484 for the #2 control keys to prevent depression of any of said keys in conjunction with the three keys named above. Likewise, depression of any one of the #2 control keys moves the stud 484 therein into the path of a corresponding obstructing surface on the segment 500 to block counter-clockwise movement of said segment 500, and thus prevents depression of any one of said three keys 474, 476, or 477. It will be noted that the Paid-Out key 473 and the Grocery key 475 in the first transaction row, upon being depressed, likewise obstruct counter-clockwise movement of the segment 500, and it should, therefore, be evident that, when either of these keys or any one of the #2 control keys 478 to 482 is depressed, the engaging mechanism for the #1 totalizer line will remain in Register or adding position, to cause the selected set of wheels on the #1 totalizer line to be engaged and disengaged with and from the primary differential members in add timing. When no counter-clockwise movement is imparted to the segment 500 (FIG. 3), as explained above, the engaging mechanism for the #2 totalizer line is retained in Register position, and, consequently, the selected set of wheels on the #2 totalizer line will be engaged and disengaged with and from the primary differential members in add timing. In a like manner, counter-clockwise movement of the segment 500, upon depression of any one of the keys 474, 476, or 477, as explained above, through the link 302, shifts the totalizer-engaging mechanism from Register position to Locked Register position, so that no engaging or disengaging movement will be imparted to the #2 totalizer line.

In the present embodiment, all of the control keys in row 1 (FIG. 2) and all of the control keys in row 2 are motorized keys, and depression of any one of these keys immediately initiates machine operation. Therefore, it is impossible that the keys of rows 1 and 2 be used in conjunction with each other, and proper interlocking mechanism is provided between the two rows of control keys to insure that, when a key in one row is depressed, no key in the other row may be either simultaneously depressed or depressed afterward, until the machine operation has been completed.

Moving the total control lever 122 (FIG. 12) to Read Row 1 or Reset Row 1 position controls the totalizer engaging mechanism to cause the selected set of totalizer wheels on the #1 totalizer line to be read or reset.

A locking plate 502 (FIG. 9) is provided for the #1 row of control keys 473 to 477 (FIG. 2) for controlling the depression of said keys in relation to the position of the total control lever 122 (FIG. 12). The locking plate 502 has a slot which engages a stud 319 in an arm 320 fast on a shaft 226 journaled in the machine framework. Also fast on the shaft 226 is an arm 1227 carrying a stud 1228, which engages a slot in the total control lever 122, thus forming a connection whereby movement of said total control lever positions said plate 502 in accordance therewith. The total control lever 122 and the locking plate 502 are normally in Register position, as shown here.

Moving the total control lever to Lock Register position moves the locking plate 502 one step clockwise to move obstructing surfaces on its periphery into the path of the studs 483 in the #1 control keys 473 to 477 inclusive, to obstruct depression of said control keys. Moving the total control lever 122 to either Read Row 2 or Reset Row 2 position moves the plate 502 two or three steps, respectively, in a clockwise direction to move the obstructing surfaces on the periphery thereof into the path of the studs 483 for all of the #1 control keys, with the exception of the Grocery key 475. This is because the Grocery key is used in this case to select the #3 totalizer on the #2 totalizer line for reading and resetting functions, as explained previously in connection with FIG. 4. Moving the total control lever 122 to Read Row 1 or Reset Row 1 position moves the locking plate 502 one or two steps, respectively, in a counter-clockwise direction to move the obstructing surfaces on the periphery thereof into the path of the studs 483 for the Sub-Total key 474, the Grocery key 475, and the Tax Total key 476, to obstruct depression of said keys when said total control lever is in either Read Row 1 or Reset Row 1 position. When the total control lever is in Read Row 1 or Reset Row 1 position, the studs 483 for the Paid-Out key 473 and the Cash Total key 477 are unobstructed, and, consequently, these keys may be used to select the corresponding totalizers on the #1 totalizer line for read and reset operations. It should be remembered that throughout this specification the terms "read and reset" and "sub-total and total" have been used interchangeably and refer to the same types of operations.

The locking plate 502 (FIG. 9) has a cam slot 503, through which extends a stud 504 secured in the free end of a link 505 (FIG. 10), the other end of which is pivotally supported by a stud 506 in a forward extension of a hook-shaped arm 507 free on the shaft 147. A spring 508, tensioned between a stud in an extension 1508 of the arm 507 and a stationary stop stud 509, urges said arm 507, the link 505, and the stud 504 counter-clockwise to normally maintain the outer end of said extension 1508 in contact with said stop stud 509. The stud 504 also extends through locking slots 510 and 511 (FIGS. 7 and 8) in the segments 485 and 486, whereupon movement of the total control lever 122 to either Read Row 1 or Reset Row 1 position causes the cam slot 503 to shift said stud 504 downwardly into engagement with the locking portions of the slots 510 and 511 to lock the segments 485 and 486 together for unitary movement. This locking of the segments 485 and 486 together permits the stud 483 in the Cash Total key 477, in cooperation with a camming surface 512 (FIG. 7) on said segment 486, to shift both of the segments the same extent to aline the #3 or group totalizer wheels 152 (FIG. 6) of the #1 totalizer line with the primary differential members 145 in cash total reading and resetting operations. This locking of the segments 485 and 486 together is necessary in Read Row 1 and Reset Row 1 operations to nullify the operation of the transfer total mechanism and thereby prevent the selection of the main item totalizer under control of the stud 483, in cooperation with the corresponding camming slot in the segment 485, as explained in connection with transfer total operations.

Taxable Total Indicator

An indicator 515 (FIGS. 2 and 11) is visible through an opening 516 in a cover plate 517 for the transaction keys, and is operated by the Taxable Grocery key 480 to remind the operator that, in this instance, a taxable total operation, under control of the Taxable Total key 476, must be performed prior to a cash total operation, which is performed under control of the Cash Total key 477. The indicator 515 (FIG. 11) is secured to an extension 518 of a slide 519 shiftably mounted on a control bar 520 by means of studs 521 therein, in cooperation with corresponding slots in said bar. A spring 522 urges the slide 519 counter-clockwise, or downwardly, to normally maintain the studs 521 in yielding contact with the downward ends of the slots in the bar 520. The bar 520 is rockably mounted in the transaction key frame by means of parallel arms 523, in cooperation with studs 259 in said frame. The bar 520 has five angular projections 524, which cooperate with the studs 483 and 484 in the control keys 473 to 482 inclusive, to prevent the simultaneous depression of the #1 and #2 control keys.

For example, depression of the Paid-Out key 473 (FIGS. 2 and 11) causes the stud 483 therein, in cooperation with the corresponding projection 524, to rock the bar 520 downwardly, or counter-clockwise, to move the projections 524 into the path of the studs 484 for the #2 transaction or control keys, to obstruct depression of these keys. Likewise, depression of the Meat key 487 causes the stud 484 therein to move into the path of the corresponding projection 524 to obstruct counter-clockwise movement of the bar 520 and thus retain the projections 524 in the path of the studs 483 in the #1 control keys to obstruct depression of these keys when a key is depressed in row 2.

Depression of the Taxable Grocery key 480 (FIG. 11) causes the stud 484 therein, in cooperation with a camming projection 525 on the slide 519, to shift said slide clockwise, or upwardly, against the action of the spring 522, to move the indicator 515 opposite the opening 516 to remind the operator that a taxable total operation must be performed. Clockwise movement of the slide 519 (FIG. 11) moves a notch 526 in the lower edge thereof opposite a tooth of a retaining pawl 527 free on a stud 528 carried by a bar 529 secured to the framework for the control keys, whereupon a torsion spring 530 urges said pawl counter-clockwise to engage its tooth with the notch 526 to retain the slide 519 in its upward position after the Taxable Grocery key 480 has been released, and until a taxable total operation is performed. Upward shifting movement of the slide 519, upon depression of the Taxable Grocery key 480, moves projections 531 and 532 thereon beneath the studs 483 in the Sub-Total key 474 and the Cash Total key 477 to obstruct depression of these keys until the pawl 527 is disengaged from the notch 526 during a subsequent taxable total operation, under control of the key 476.

The pawl 527 (FIG. 11) has an extending finger 533, which cooperates with a stud 534 (FIG. 3) in an arm 535 shiftably mounted on the segment 500 by means of a slot in the lower end of said arm, which freely engages a hub of said segment, and by means of an angular slot 536 near the upper end of said arm, which engages a stud 541 in said segment 500. A spring 537 urges the arm 535 upwardly, to normal position, in which a flat portion of a stud 538, mounted in a downward extension of said arm 535, is above and out of the path of an operating extension 539 on a clutch pinion supporting arm 540 for the second transaction or control bank. The arm 540 is fast on a clutch pinion shaft 1540 journaled in the machine framework. A downward extension of the arm 540 pivotally supports a clutch pinion 148 for clutching together the primary and secondary differential members for the second transaction bank. Near the beginning of a machine operation, the shaft 1540, the arm 540, and the pinion 148 are rocked clockwise (FIG. 3) to disengage said pinion 148 from the teeth in the primary and secondary differential members, and said pinion remains disengaged while said primary member is positioned under control of the depressed control key and the secondary member is restored to zero. The shaft 1540, the arm 540, and the pinion 148 are then returned counter-clockwise to reengage said pinion with the differential members, after which the primary member is returned to zero position and positions the secondary member, the type wheels, and the indicators in accordance with the depressed control key in exactly the same manner as fully explained in connection with FIGS. 12 and 13 in the co-pending application Serial No. 341,633.

Depression of the Taxable Total key 476 (FIGS. 2 and 3), to initiate a taxable total operation, causes the stud 483 therein, in cooperation with the corresponding camming slot in the segment 500, to rock said segment downwardly, or counter-clockwise. Counter-clockwise movement of the segment 500 causes the stud 541 therein, in cooperation with the angular slot 536, to carry the arm 535 counter-clockwise in unison therewith to move the stud 538 into the path of the operating extension 539. Clockwise disengaging movement of the clutch pinion arm 540, at the beginning of a taxable total operation, causes the extension 539, in cooperation with the stud 538, to shift the arm 535 downwardly and counter-clockwise, under control of the spring 537 and the angular slot 536, to cause the stud 534 to engage the finger 535 and rock the pawl 527 (FIG. 11) clockwise, against the action of the spring 530, to disengage the tooth of said pawl from the notch 526. This frees the slide 519 to the action of the spring 522, which immediately restores said slide downward to normal position, as shown here, in which position the indicator 515 is not visible through the opening 516. This restoring movement of the slide 515 also moves the projections 531 and 532 thereon out of the path of the studs in the Sub-Total and Cash Total keys to free said keys for subsequent depression, to initiate sub-total or cash total operations.

*Mode of Operation*

The receipt shown in FIG. 5 is printed during a multiple-item transaction, which comprises several item-entering operations and a final cash total operation, said item-entering operations including the entering of taxable and non-taxable items, and an enforced taxable total operation to ascertain the total amount of the taxable items, so that the tax in connection therewith may be computed and entered in the tax totalizer. The data at the top of the receipt, including the statement "Dual Itemizer," the consecutive number "014," and the date "–6 Feb 54," are printed at the end of the preceding operation and form the heading for the receipt to be issued in the next succeeding operation.

First, the operator makes sure that the total control lever 122 (FIGS. 1 and 12) is in Register position, then depresses the proper clerk's key 120 (in this case "A"), and sets up the amount of the first item, "$1.27," on the amount keys 109. Inasmuch as this first item is a non-taxable grocery item, the Grocery key 475 (FIG. 2) is depressed to initiate machine operation, and during this operation this key causes the amount of the Grocery item to be added in the main item totalizer on the #1 line and in the #3 or Grocery totalizer on the #2 line. Also during this machine operation, the amount of the grocery item, the clerk's initial, and a symbol of the type of operation, "Groc," are printed on the first line of the receipt (FIG. 5), after which said receipt is line-spaced in preparation for the printing of the second item.

Next, the amount of the second item, "$3.00," is set up on the amount keys, and, as this is for the purchase of produce, the Produce key 479 in the second control row is depressed to initiate machine operation. During machine operation, the amount of the produce item, the clerk's initial, and a symbol of the operation, "Prod," are printed on the second line of the receipt, after which said receipt is line-spaced in preparation for the third item.

The depression of the Produce key 479 also selects the main item totalizer on the #1 line, and the fourth or produce totalizer on the #2 line, and during machine operations the amount of the produce item is added in these two totalizers.

Next, the amount of the third item, "$4.00," is set up on the amount keys, and, as this is for the purchase of meat, the Meat key 478 in row 2 is depressed to initiate machine operation, during which operation the amount of the meat item is added in the main item totalizer on the #1 line, and in the meat or #5 totalizer on the #2 line. Also, during machine operation, the amount of the meat item, the clerk's initial, and an identifying symbol, "Meat," are printed on the third line of the receipt (FIG. 5), after which said receipt is line-spaced in preparation for the fourth item.

The amount of the fourth item, "$2.50," is set up on the amount keys, and, inasmuch as this is a taxable grocery item, the Taxable Grocery key 480 in the second transaction row (FIG. 2) is depressed to initiate machine operation. The Taxable Grocery key selects the auxiliary item totalizer on the #1 line and the grocery or #3 totalizer on the #2 line for addition, and during machine operation the amount of the taxable grocery item is added in these two totalizers. Also during machine operation the amount of the taxable grocery item, the clerk's initial, and a symbol "Tax Groc" are printed on the fourth line of the receipt (FIG. 5), after which said receipt is line-spaced in preparation for the fifth item.

The amount of the fifth item, "$1.40," is set up on the amount keys, and, inasmuch as this is a special item, the Special key 481 in the second transaction row is depressed to initiate machine operation. The Special key 481 selects the main item totalizer on the #1 line, and the special or #2 line for addition, and during machine operation the amount of the special item is added in these totalizers. Also, during machine operation the amount of the special item, the clerk's initial, and a symbol to identify the operation, "Spec," are printed on the fifth line of the receipt, after which said receipt is line-spaced in preparation for the next item.

Inasmuch as there are no more items to be entered in this multiple-item transaction, the operator depresses the Taxable Total key 476 to initiate a taxable total operation, during which the auxiliary item totalizer is cleared, and in a transfer total operation, as explained in connection with FIGS. 7 and 8, the amount of the taxable total is added in the main item totalizer during the latter part of the taxable total operation. It will be noted by referring to FIG. 5 that the amount of the taxable total is not printed upon the receipt, but is set up on the amount indicators only, and, as these indicators remain in set position at the end of the taxable total operation, the operator may ascertain from them the amount of the tax on the taxable total, which in this case is eight cents. The amount of the tax, ".08," is then set up on the amount keys, after which the Tax key 482, in row 2, is depressed to initiate a tax operation, during which the amount of the tax is added in the main item totalizer on the #1 line, and in the #1 or tax totalizer on the #2 line. Also, during the tax operation, the amount of the tax, the clerk's initial, and a symbol, "Tax," are printed on the sixth line of the receipt after which said receipt is double-line-spaced in preparation for the final operation.

It will be recalled that depressing the Taxable Total key 476 unlocks the Cash Total key 477, and the operator depresses this latter key to initiate the final, or cash total, operation of a multiple-item transaction. By referring to FIGS. 7 and 8, it will be recalled that depression of the Cash Total key 477 initiates a transfer total operation, during which the main item totalizer, which contains a total of all the items entered on the receipt (FIG. 5), is cleared, and the amount therein is transferred to the group or #3 totalizer on the #1 line. Also, during the cash total operation, the amount of the cash total, "$12.25," the clerk's initial, and a symbol of the operation, "Total," are printed on the seventh line of the receipt. Also during the cash total operation the words "Presorting Eliminated" are printed near the bottom edge of the receipt, after which said receipt is fed outwardly, the proper extent in relation to the tearing blade, located in the opening 138 (FIG. 1) in the cabinet 105, so that said receipt may be severed from the web of the receipt material.

The Sub-Total key 474 (FIG. 2) may be used to initiate a sub-total operation to read the amount in the main item totalizer at any time, except during the interim between the entry of a taxable grocery item and the taking of a taxable total, during which interim said Sub-Total key is locked against depression, as explained in connection with FIG. 11.

The machine is provided with the usual detail strip 140 (FIG. 1), upon which all of the data except the date and the information at the extreme upper and lower edges of the receipt (FIG. 5) is printed, to provide a record of all operations for use by the proprietor or other person in charge.

While the forms of mechanisms herein shown and described are admirably adapted to fulfill the objects primarily stated, it is to be understood that it is not intended to confine the invention to the forms or embodiments herein disclosed, for it is susceptible of embodiment in various other forms, all coming within the scope and spirit of the invention.

What is claimed is:

1. In a machine of the class described, constructed and arranged to perform multiple-item transactions, comprising several item-entering operations, and a final item-total operation, said item-entering operations comprising the entering of both taxable and non-taxable items, the combination of a main item totalizer to accumulate the non-taxable items; an auxiliary item totalizer to accumulate the taxable items; a group totalizer to receive amounts cleared from the main item totalizer; a taxable total control element to initiate taxable total operations; an item-total control element to initiate item-total operations; means including a first member controlled by either of the control elements to select the corresponding item totalizer for a total-taking or clearing operation; means including a second member controlled by the taxable total control element to cause the main item totalizer to be selected to receive the total cleared from the auxiliary item totalizer, said second member also controlled by the item-total control element to cause the group totalizer to be selected to receive the amount cleared from the main item totalizer; and means effective in certain operations other than item-entering or item-total operations to cause the two members to be connected for concert movement to cause the item total control element to select the group totalizer for a total-taking or clearing operation.

2. In a machine of the class described, constructed and arranged to perform multiple-item transactions, comprising several item-entering operations and a final item-total operation, said item-entering operations including the entering of both taxable and non-taxable items, said machine having a total control mechanism operable to condition said machine for adding or total-taking functions, the combination of a main item totalizer to accumulate the non-taxable items; an auxiliary item totalizer to accumulate the taxable items; a group totalizer to receive amounts cleared from the main item totalizer; a taxable total control element to initiate taxable total operations; an item total control element to initiate item total operations; means including a first member controlled by either of the control elements to select the corresponding item totalizer for total-taking or clearing operations; means including a second member controlled by the taxable total control element to cause the main item totalizer to be selected to receive the total cleared from the auxiliary item totalizer, said second member also controlled by the item total control element to cause the group totalizer to be selected to receive the amount cleared from the main item totalizer; and means rendered effective by the total control mechanism, when operated to condition the machine for total-taking functions, to connect the two members for concert movement to cause the item total control element to select and condition the group totalizer for a total-taking operation.

References Cited in the file of this patent

UNITED STATES PATENTS

| | | |
|---|---|---|
| 1,756,350 | Fuller | Apr. 29, 1930 |
| 2,167,715 | Green | Aug. 1, 1939 |
| 2,759,667 | Werner et al. | Aug. 21, 1956 |
| 2,911,141 | Jackson et al. | Nov. 3, 1959 |

UNITED STATES PATENT OFFICE
CERTIFICATE OF CORRECTION

Patent No. 3,031,134                          April 24, 1962

Frank R. Werner et al.

It is hereby certified that error appears in the above numbered patent requiring correction and that the said Letters Patent should read as corrected below.

Column 1, line 26, for "tow" read -- two --; column 5, line 23, for "on" read -- or --; column 7, line 74, for line #1" read -- #1 line --; column 16, line 35, before "line" insert -- totalizer on the #2 --.

Signed and sealed this 28th day of August 1962.

(SEAL)
Attest:

ESTON G. JOHNSON
Attesting Officer

DAVID L. LADD
Commissioner of Patents